United States Patent

Hall

Patent Number: 5,346,292
Date of Patent: Sep. 13, 1994

[54] ACTIVE COMPENSATION SYSTEM

[75] Inventor: Thomas J. Hall, Holly, Mich.

[73] Assignee: ITT Corporation, New York, N.Y.

[21] Appl. No.: 51,112

[22] Filed: Apr. 21, 1993

[51] Int. Cl.⁵ .............................................. B60T 8/32
[52] U.S. Cl. ........................................ 303/91; 303/68;
303/100; 303/113.1; 303/119.1; 303/116.1;
303/61; 188/152
[58] Field of Search ................... 303/91, 100, 119.1,
303/119.2, 68, 61, 113.1, 113.4, DIG. 1, DIG.
2, 92, 102, 103, 105, 110, 111, 116.1; 188/181 A,
181 R, 152, 346; 364/426.01

[56] References Cited

U.S. PATENT DOCUMENTS

| | | | |
|---|---|---|---|
| 3,847,449 | 11/1974 | Adahan | 303/61 X |
| 4,482,192 | 11/1984 | Leiber | 303/100 |
| 4,580,847 | 4/1986 | Burgdorf | 303/100 |
| 4,645,272 | 2/1987 | Leiber | 303/119 |
| 4,702,531 | 10/1987 | Kircher et al. | 303/114 |
| 4,807,944 | 2/1989 | Weise | 303/114 |
| 4,826,255 | 5/1989 | Volz | 303/10 |
| 4,826,256 | 5/1989 | Von Hayn et al. | 303/61 |
| 4,840,436 | 6/1989 | Burgdorf et al. | 303/119 |
| 4,914,917 | 4/1990 | Schoniau | 60/545 |
| 4,919,496 | 4/1990 | Burgdorf et al. | 303/114 |
| 5,044,702 | 9/1991 | Beck et al. | 303/100 |

FOREIGN PATENT DOCUMENTS

| | | |
|---|---|---|
| 3808523 | 9/1989 | Fed. Rep. of Germany . |
| 2195723 | 4/1988 | United Kingdom . |
| 2209198 | 5/1989 | United Kingdom . |
| 2213542 | 8/1989 | United Kingdom . |
| 2215793 | 9/1989 | United Kingdom . |

*Primary Examiner*—Douglas C. Butler
*Attorney, Agent, or Firm*—Robert P. Seitter; J. Gordon Lewis

[57] ABSTRACT

An active compensation system for an anti-locking brake system eliminates undesirable brake fluid pressure buildup and, therefore, brake drag by controlling the normally closed valves within the anti-locking brake system through the anti-locking brake system electronic control module to allow the undesired pressure to be released as the brake fluid passes through the normally closed outlet valves into pressure relieving conduits.

24 Claims, 2 Drawing Sheets

FIG 3
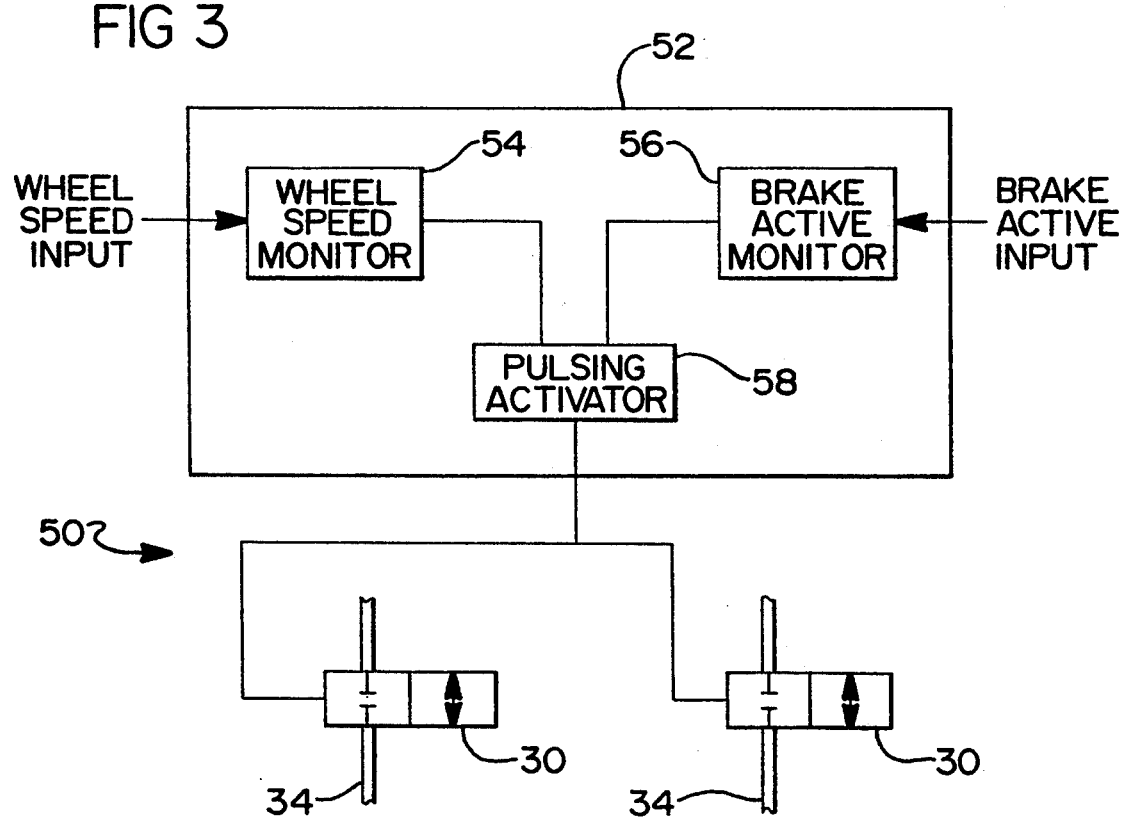
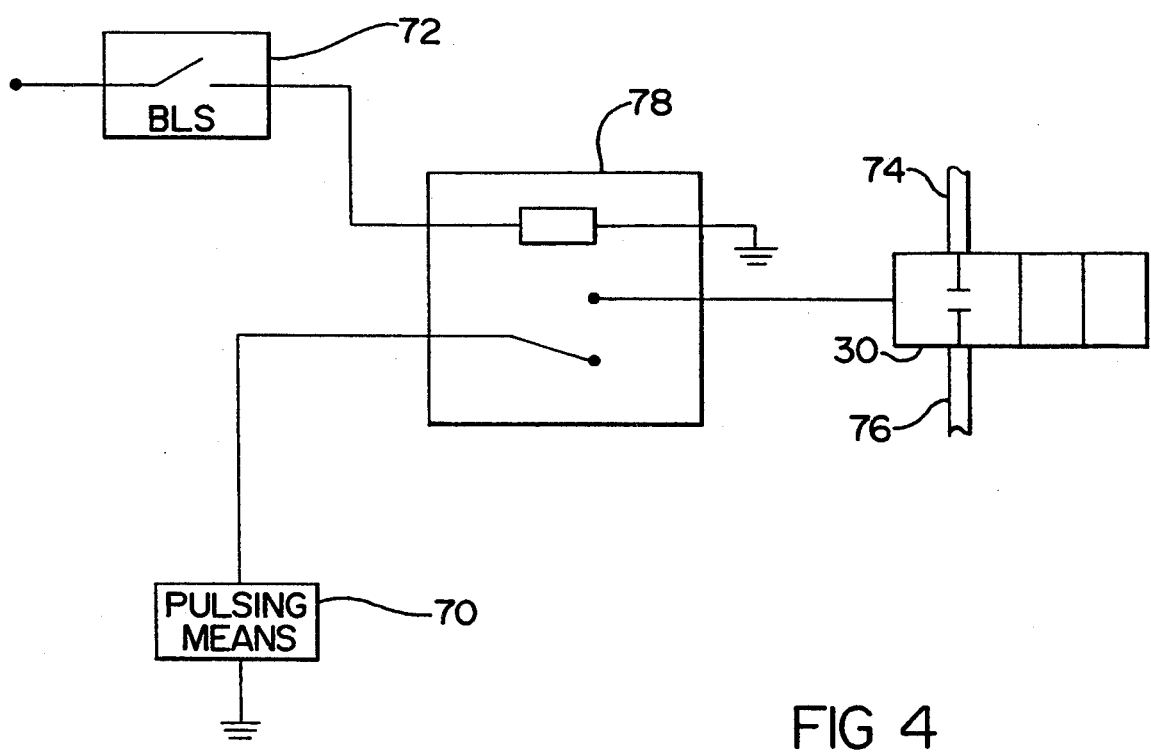
FIG 4

ACTIVE COMPENSATION SYSTEM

BACKGROUND OF THE INVENTION

1. Field of the Invention

The present invention broadly relates to vehicle brake systems. More specifically, the present invention relates to eliminating undesirable brake fluid pressure within brake conduits that builds up during brake application in anti-locking brake systems. The present invention encompasses a method of controlling the normally closed outlet valves within an anti-locking brake system to release unwanted pressure by allowing the hydraulic brake fluid to return to the system's reservoir and, thereby, reestablish the pressure within the system at reservoir pressure.

2. The Prior Art.

Modern automobile anti-locking brake systems facilitate maintaining vehicle stability during brake application. Brake systems essentially work by controlling the pressure of the hydraulic brake fluid within the brake conduits that make up the anti-locking brake system. Anti-locking brake systems inherently include a pressure buildup within the conduits between the master cylinder and the brake pads. Heat builds up within the brake system when the brakes are applied. Increased heat causes pressure buildup within the system because there is a fixed volume of fluid. This increased pressure buildup is undesirable because it causes brake drag after the brake pedal is released by the user. The excess pressure must be released within the system in order to avoid brake drag. Brake drag is a progressive problem; it, in turn, causes additional heat buildup and further brake drag. Several methods attempt to avoid this excessive pressure and brake drag; however these methods have several shortcomings and drawbacks.

One attempt at avoiding excess pressure buildup and resulting brake drag in a hydraulic anti-locking brake system includes using a compensation port design in the master cylinder. The compensation port design has limited use for anti-locking brake systems because the brake fluid is returned to the master cylinder under high pressure. The compensation port design includes a lip seal that is typically fashioned of rubber. The lip seal is connected to the piston within the master cylinder that activates the brakes. The inherent high pressure within an anti-locking brake system forces brake fluid against the lip seal, causing the lip seal to extrude into the compensation port. Any further movement of the brake pedal tears the lip seal because it extrudes into the compensation port. This results in a damaged lip seal, and therefore, an inadequate brake system.

Another attempt at relieving the unwanted pressure buildup within an anti-locking brake system includes central valves connected to the master cylinder. The central valve design typically includes at least one ball and seat valve connected between the master cylinder and the brake fluid reservoir. When the brakes are applied, the central valve remains closed so the brake fluid will be forced into the brake conduits causing a braking action to slow down the vehicle. Once the brake pedal is released, the remaining excess pressure within the brake conduits must be released to avoid brake drag. The central valves facilitate releasing the excess, unwanted pressure by opening the compensation port and, thereby, allowing the fluid to flow back through the master cylinder into the brake fluid reservoir. The central valve compensation design avoids the problems involved with the lip seal/compensation port design. However, the central valve design includes several drawbacks.

First, the central valve design is extremely complicated. Second, the central valve design is very difficult to assemble because of the number of parts involved and the nature of those parts. Therefore, the central valve design is both complicated and difficult to assemble, it adds cost to the braking system, in turn adding cost to the vehicle. Further, central valves, when opened as just described, must be reclosed upon a subsequent brake application. The time it takes to reclose the central valves introduces lost travel time and a consequent delay in proper function within the brake system.

SUMMARY OF THE INVENTION

The present invention eliminates undesirable pressure buildup and brake drag within an anti-locking brake system. The inventive method of eliminating brake drag requires no central valves nor any compensation ports in a conventional master cylinder. The inventive active compensation system works through electronic control of the normally closed valves found in most anti-locking brake systems. Therefore, the present invention eliminates the need for complicated, expensive hardware as typically added to a conventional master cylinder.

The method associated with the present invention is performed generally by pulsing the normally closed outlet valves within the brake system at a preselected pulsing frequency for a preselected time period. The normally closed valves are pulsed when the braking system is deactivated and undesirable brake drag exists. The electronic control module of the braking system utilizes wheel speed information to determine when the system is deactivated and brake drag exists and responsively pulses the normally closed valves to thereby allow any undesirable excessive brake fluid pressure to exit the brake conduits through the normally closed valves and pressure relief conduits.

A typical anti-locking brake system includes a master cylinder, brake conduits, normally open inlet valves, normally closed outlet valves and pressure relieving conduits. When the automobile brake pedal is applied, the brake fluid is forced into the brake conduits. The brake fluid passes through the normally open valves causing a pressure buildup in the conduit forcing the brake pad to bear against the wheel, thereby causing vehicle deceleration. The normally closed valves are included in the brake circuit to release pressure should the pressure within the conduit become great enough to cause the wheel to "lock" and the anti-locking function to operate. In normal anti-locking brake systems, the normally closed valves are only used during an anti-lock operation. Once the brake pedal is released, the normally closed valves stay closed and the normally open valves stay open. However, due to heat buildup within the system, excessive brake fluid pressure remains in the brake conduit between the master cylinder and the wheel brakes despite the fact that the brake pedal has been released. The heat inherent in a braking application is transferred into the brake fluid. Excess heat causes increased, undesirable pressure because the brake fluid within a braking system has a fixed volume. The excess pressure that remains in the brake conduit after the brake pedal is released causes the brake pad to bear against the wheel, causing the condition commonly known as brake drag. The inventive active compensation system avoids this excess pressure and, therefore, brake drag by pulsing the normally closed valves. Once the brake pedal is released, the inventive active compensation system will be activated.

When the inventive active compensation system is activated. The anti-locking brake system electronic controller drives the normally closed outlet valves, causing them to open and close cyclically at a preselected frequency for a preselected time. When the normally closed outlet valve is in the open position, brake fluid in the brake conduit can travel through a pressure relieving conduit, back to the brake fluid reservoir without going through the master cylinder. By opening the normally closed outlet valves while the brake pedal is not applied, excess pressure that would otherwise cause brake drag, is redistributed through the system and some of the brake fluid travels back to the reservoir. The system's pressure is then reestablished at reservoir pressure. The reservoir pressure within a brake system is commonly known as the rest pressure which may be equal to atmospheric pressure. The cyclical opening and closing of the normally closed outlet valves is referred to as pulsing. Pulsing the normally closed outlet valves is necessary because the valves are not designed to stay open for a prolonged time. Further, pulsing is desirable to minimize any delay in reestablishing braking pressure within the brake conduits when necessary. Further, there is an inherent delay in the trigger switch that would activate the normally closed outlet valves. Therefore, pulsing the outlet valves facilitates reestablishing brake pressure within the brake conduits when the brakes are reapplied.

The normally closed outlet valves are controlled in the manner described above through the electronic anti-locking brake system control module that is already present in the system. The inventive active compensation system includes an algorithm that enables the electronic controller to pulse the normally closed outlet valves according to the above description. The electronic anti-locking brake system control module circuitry drives the inventive system. The electronic controller utilizes available wheel speed information. Wheel speed information is used to control most anti-locking brake systems. The present invention includes using wheel speed information to determine when brake drag exists to properly activate the inventive compensation system.

A number of possible inputs are available and can be utilized in combination with the wheel speed data, to activate and deactivate the inventive compensation system. The various inputs include the brake light switch state, the brake pedal travel switch or sensor state, the pressure switch state and the vehicle speed information. All these "inputs" are typically available from the anti-locking brake system electronic controller. Utilizing one or more of these inputs in combination with the wheel speed data provides additional accuracy and reliability.

These and other features and objects of the present invention will be seen in the following specification and claims in conjunction with the appended drawings, of which the following is a brief description.

BRIEF DESCRIPTION OF THE DRAWINGS

FIG. 3 is a schematic diagramatic representation of how the electronic control module uses wheel speed data as an activator/deactivator of the inventive active compensation system.

FIG. 4 is a schematic diagram illustrating one embodiment of a system for use with non-antilocking brake systems.

DETAILED DESCRIPTION OF THE INVENTION

Figure 1:
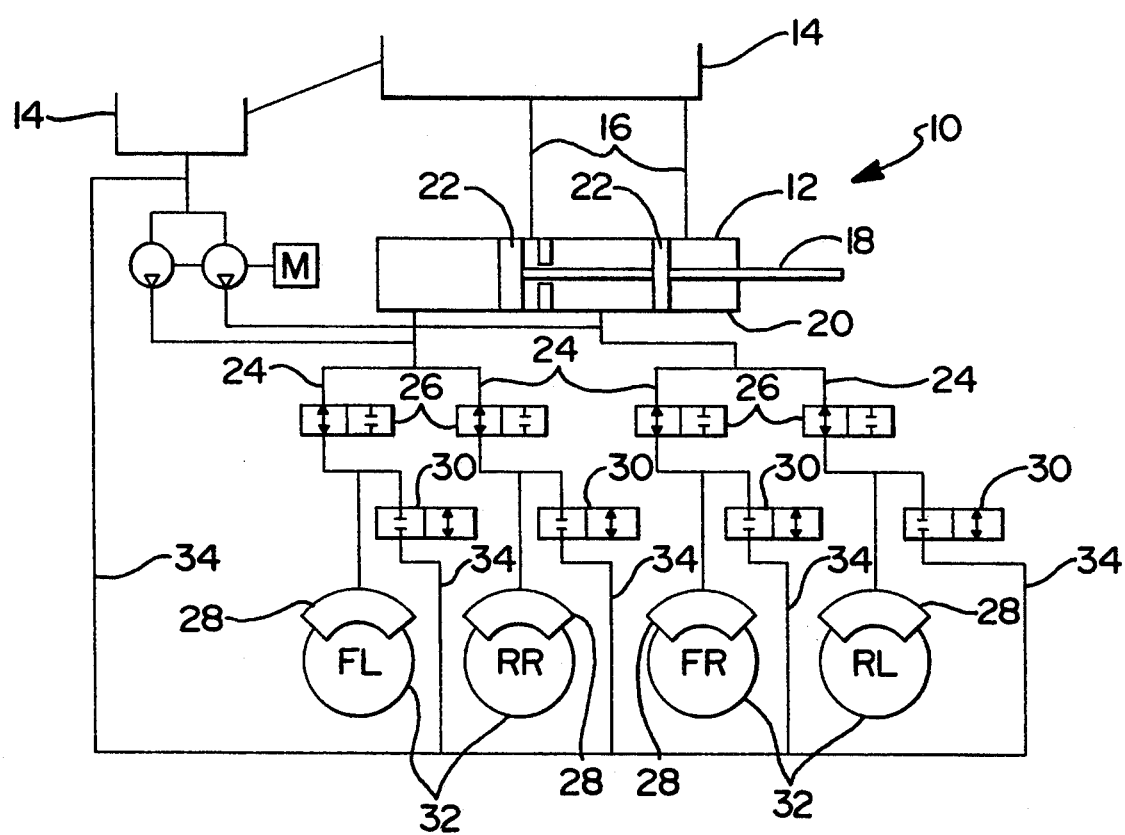
FIG. 1 is a schematic diagramatic illustration of the hardware components of the inventive active compensation system.

FIG. 1 is a schematic diagram showing the preferred components in the inventive active compensation system 10. A master cylinder 12 is connected to a brake fluid reservoir 14 through brake fluid inlet conduits 16. When the vehicle brake pedal (not shown) is depressed, the piston 18 moves within the master cylinder 20 (from right to left according to the drawing). When the piston 18 moves in this manner, lip seals 22 are forced from right to left that, in turn, force brake fluid out of the master cylinder 20 and into the brake conduits 24. Brake fluid travels through the brake conduits 24 passing through the normally open inlet valves 26 toward the brake pads 28. The normally closed outlet valves 30 remain closed during this braking operation so that brake fluid pressure builds up within the brake conduits 24 forcing the brake pads 28 to bear harder against the wheels 32 to thereby cause deceleration of the vehicle.

In anti-locking brake systems, the normally closed valves 30 typically function as pressure releasers during an anti-locking operation. For example, when the brake pedal is forcefully depressed for a prolonged period of time the pressure buildup within the brake conduit 24 may cause the brake pad 28 to bear against the wheel 32 such that the wheel will "lock". The anti-locking brake system operates by releasing some of the pressure from within the brake conduit 24 by allowing brake fluid to flow through the normally closed valves 30 into the pressure relieving conduit 34 where it can then return to the brake fluid reservoir 14. The details of how an anti-locking brake system operates is well known in the art and, therefore, will not be described further.

Under normal operating conditions, when the brake pedal (not shown) is released, the piston 18 moves back through the master cylinder, 20 (from left to right according to the drawing). However, in an anti-locking brake system, releasing the pressure on the brake pedal does not instantaneously, in turn, release the pressure from the brakes. A normal braking application causes heat buildup on the brake pads 28. The heat buildup is transferred into the hydraulic brake fluid within the brake conduits 24, and the fluid temperature rises. This heat causes pressure buildup within the brake conduits 24 because there is a fixed volume of fluid within the system. Therefore, excessive, undesirable pressure remains within the brake conduits 24 causing the brake pads 28 to bear against the wheels 32 despite the fact that the brake pedal has been released. This condition is commonly known in the art as "brake drag".

The inventive active compensation system is activated when the brake pedal is released and undesirable brake fluid pressure exists within the brake conduits 24 causing brake drag.

The normally closed valves 30 are controlled using the circuitry already present in a typical anti-locking brake system electronic control module also known as an electronic controller (not shown). Typical anti-locking brake system electronic controllers monitor wheel speed.

Electronic controllers typically also have a variety of data available during system operation that describe the status of various systems on the vehicle.

The inventive active compensation system can be driven by the anti-locking brake system electronic controller circuitry with additional software and an algorithm that utilizes wheel speed data signals as input signals to the controller for activating the system. The electronic controller preferably drives the inventive system generally as follows.

Typical electronic controllers monitor wheel speed relative to the vehicle speed to control the anti-locking brake system. This same information is used in the method associated with inventive active compensation system. The electronic controller will pulse the normally closed valves 30 when at least one of the wheels is decelerating relative to the vehicle. Wheels decelerate for various reasons including a brake application, ascending a hill or brake drag. The inventive active compensation system is preferably activated only when brake drag exists. Therefore, the electronic controller requires another input besides wheel speed relative to the vehicle. The electronic controller preferably effectively couples wheel speed information with brake system status information. A typical electronic controller includes a braked active indicator that monitors when the brake system is activated. The electronic controller will pulse the normally closed valves 30 according to the method of the present invention only when at least one wheel is decelerating relative to the vehicle and the brake system is not currently in use. In this manner, the inventive active compensation system functions without interfering with the normal brake system and preferably only when brake drag exists. For example, if the brake active indicator indicates that the brake system has been deactivated and the wheel speeds are decelerating relative to the vehicle speed, the electronic controller responsively pulses the normally closed valves 30 because brake drag is indicated.

The inventive system can be made more reliable and accurate by combining further inputs available from a typical electronic controller.

First, the state of the brake light switch can be used as a signal to the inventive system that the brake lights are off and, therefore, the pedal has been released. Second, the pedal travel switch status signal or the pedal travel sensor signal can be a signal defining when the brake pedal has been released. Third, the pressure switch state can be a signal that the brake pedal was released. Any or all of the above data in combination with the wheel speed data can be used to control the inventive active compensation system. Utilizing additional data provides the advantage of improving the accuracy and reliability of the system.

The normally closed valves 30 are opened and closed cyclically at a preselected frequency for a preselected period. This cyclical opening and closing of the valves is called pulsing. Pulsing enables the fluid, and the corresponding pressure, within the brake conduits 24 to pass through the normally closed valves 30 while they are open, into the pressure relieving conduits 34. The brake fluid can then return to the reservoir 14 where it remains available for subsequent brake applications. Pulsing the normally closed valves 30 releases the excess pressure from the brake conduit 24 allowing the pressure within the system to stabilize at reservoir pressure which is typically equal to atmospheric pressure. In this manner, brake drag is eliminated and excess, undesirable brake fluid pressure is dissipated through the system.

It is desirable to pulse the normally closed valves 30, rather than leaving them open for a prolonged time, for several reasons. First, the normally closed valves 30 are not designed to withstand a prolonged open state. Second, it may be necessary to suddenly reestablish brake pressure within the brake conduit should the vehicle operator reapply the brakes. There is an inherent delay in the switching mechanism used to pulse the normally closed valves. When the valves are open, there will be some delay in reestablishing brake pressure within the brake conduit upon reapplication of the brakes. This delay can cause lost travel time and an undesirable delay in decelerating the vehicle. Pulsing the normally closed valves 30 facilitates minimizing any time delay in reestablishing brake pressure within the brake conduits 24.

For similar reasons, the normally closed valves 30 should be pulsed for a limited time period to increase responsiveness at the next brake application. Further, a continuous pulsing of the normally closed valves, whenever the brake pedal is not depressed, could cause additional wear on the system or damage the normally closed valves 30.

The frequency of each pulse and the time period pulsing lasts can be preselected. The timing of the pulses will depend on expected braking conditions. The timing of the pulses can also be varied depending on the actual data processed by the electronic controller. For example, the amount of pressure within the brake conduits can be determined internally based on data available from the controller. The timing of the pulses can be adjusted accordingly to eliminate the undesirable pressure as efficiently and safely as possible.

Figure 2:
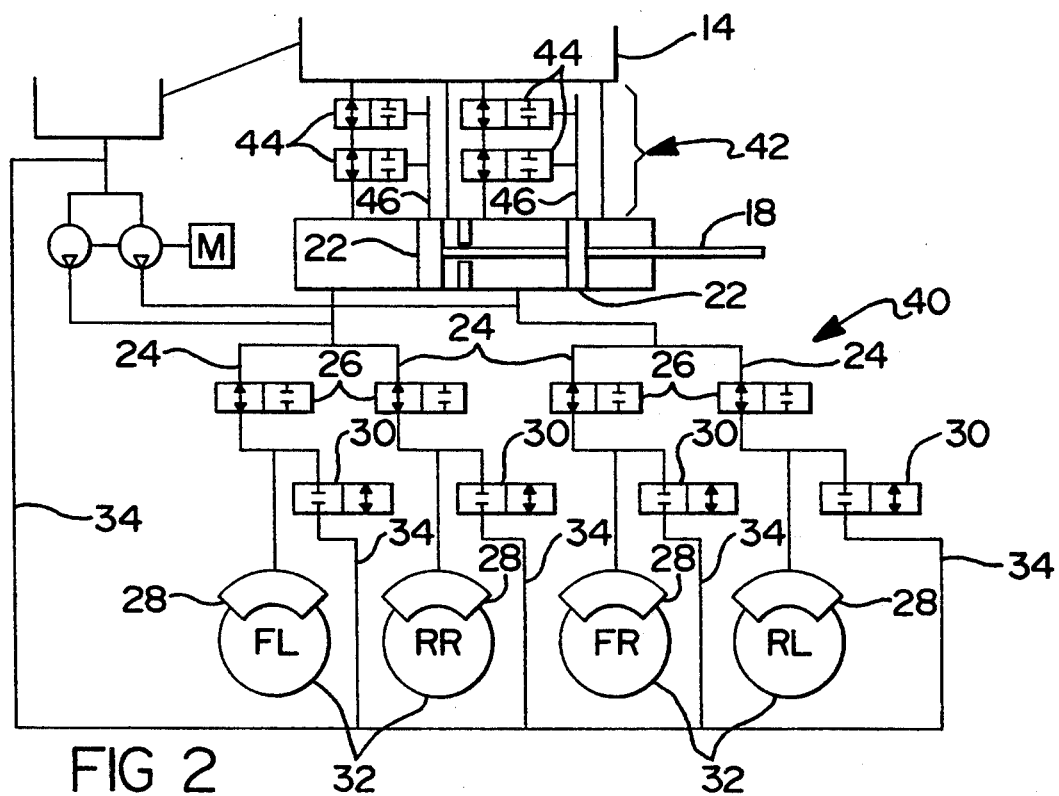
FIG. 2 is a schematic diagramatic illustration of a prior art anti-locking brake system showing the central valve configuration.

FIG. 2 is a schematic drawing of one example from the prior art. FIG. 2 illustrates an anti-locking brake system 40 with a central valve compensation system. The additional hardware needed to compensate for undesirable brake fluid pressure and resulting brake drag when using the illustrated central valve compensation system is shown generally at 42. Central valves 44 are connected between the brake fluid reservoir 14 and the master cylinder 20 through the compensation ports 46. Otherwise, the anti-locking brake system is essentially the same as that illustrated schematically in FIG. 1. The central valves 44 are complicated and, therefore, costly and difficult to assemble. Therefore, the system illustrated in FIG. 2 is more complex, expensive and cumbersome than that illustrated in FIG. 1.

The system illustrated in FIG. 2 operates generally as follows. After the brake pedal (not shown) is depressed and later released, excess, undesirable brake fluid pressure still exists in the brake fluid conduits 24. This excess pressure is released by allowing the brake fluid within the brake conduits 24 to pass back through the normally open valves 26 into the master cylinder 20. The fluid is then allowed to pass through the compensation ports 46 and the central valves 44 into the main reservoir 14 so the brake fluid pressure can be reestablished at reservoir pressure. The central valves 44 are typically a ball and seat valve including rather complex and expensive components. The ball and seat style central valve is well known in the art and therefore, will not be described further.

Clearly, therefore, the system illustrated in FIG. 1 is more efficient than the system illustrated in FIG. 2 in terms of cost, manufacturing, assembly and production. Further, reducing the number of components within the anti-locking brake system to a minimum increases the system's efficiency and reliability.

FIG. 3 schematically illustrates one way that the electronic controller circuitry, utilizing wheel speed data as described above, can drive the inventive active compensation system. FIG. 3 illustrates, in block diagram form, activation system 50. Electronic controller 52 contains circuitry and logic that functions as a wheel speed monitor 54 and a brake active indicator 56. Further, electronic controller 52 includes pulsing activator 58. Pulsing activator 58 is coupled with normally closed valves 30.

Wheel speed monitor 56 determines when the individual vehicle wheels are decelerating undesirably as described above. Wheel speed monitor 54 transmits appropriate signals pulsing activator 58 indicating that undesirable brake drag exists. Brake active indicator 56 concurrently transmits appropriate signals indicating whether the brake system is currently activated or in use. When pulsing activator 58 receives appropriate signals, it pulses normally closed valves 30 until the undesirable brake fluid pressure dissipates.

The illustrated pulsing activator 58 internally contains a frequency and timing regulator (not shown). The frequency and timing regulator controls the frequency of the pulses, i.e., the amount of time that the normally closed valves 30 are cyclically opened and subsequently closed. The frequency and timing regulator also controls the time period that the normally closed valves 30 are pulsed. In this manner, the pulsing means is activated for only a short period after the brake pedal (not shown) is depressed and released. When the brake pedal is subsequently depressed, the brake active indicator will turn on, thereby, causing the relay switch to deactivate the pulsing means, allowing the anti-locking brake system to function as desired.

The method associated with the present invention can be implemented in brake systems that do not have an anti-locking feature nor an associated electronic controller. FIG. 4 illustrates one embodiment of a system for use with non anti-locking brake systems. Pulsing means 70 utilizes information from brake light switch 72 to activate or pulse normally closed valve 30. Normally closed valve 30 is appropriately connected to brake conduit 74, which is appropriately connected to wheel brakes (not shown), and pressure relief conduit 76, which is connected to the brake system master cylinder (not shown) so undesirable brake fluid pressure can dissipate as brake fluid travels through valve 30 and pressure relief conduit 76 to the master cylinder.

Relay switch 78 effectively activates pulsing means 70 after brake light switch 72 turns on and subsequently off; corresponding to a brake application that is now complete. Pulsing means 70 then cyclically opens and closes, or pulses, normally closed valve 30 to relieve any undesirable brake fluid pressure built up within brake conduit 74.

Pulsing means 70 preferably include an internal timing device or circuitry that regulates the frequency and period of the pulsing. A timing device could also be included internally with relay switch 78 or as a separate component.

It will be apparent to those skilled in the art that the foregoing disclosure is exemplary in nature rather than limiting, the invention being limited only by the appended claims.

What is claimed is:

1. A method of eliminating excessive brake fluid pressure buildup that causes undesirable brake drag in a vehicle open hydraulic antilocking brake system of the type having an electronic controller and a brake conduit connected to a normally closed outlet valve that is connected to a pressure relief conduit, comprising the steps of:
   (A) determining a time when the antilocking brake system is deactivated, using the electronic controller;
   (B) determining a condition when brake drag exists, using the electronic controller; and
   (C) pulsing the normally closed outlet valve beginning at the time in step (A) when the condition from step (B) exists, using the electronic controller, to thereby allow the excessive brake fluid pressure to exit the brake conduit through the normally closed outlet valve and the pressure relief conduit.

2. The method of claim 1 wherein step (A) is performed by the substep of determining the time when the brake system is deactivated using a brake active indicator, said brake active indicator being part of the electronic controller.

3. The method of claim 2 wherein step (A) is performed by the substep of determining a switch off time when the brake active indicator indicates that the brakes have been applied and subsequently released.

4. The method of claim 3 wherein step (A) is performed by the substep of defining the time when the braking system is deactivated as said switch off time.

5. The method of claim 1 wherein step (B) is performed by the substeps of determining the vehicle speed, a required wheel speed for each wheel and the actual wheel speed of each wheel, respectively.

6. The method of claim 5 wherein step (B) is performed by the substeps of comparing the required wheel speeds to the actual wheel speeds, respectively.

7. The method of claim 6 wherein step (B) is performed by the substep of defining the condition when brake drag exists as the condition when at least one of the actual wheel speeds is less than the corresponding required wheel speed.

8. The method of claim 1 wherein step (B) is performed by the substeps of determining the vehicle speed and determining the actual speed of each wheel, respectively.

9. The method of claim 8 wherein step (B) is performed by the substep of comparing the vehicle speed to the actual wheel speeds, respectively.

10. The method of claim 9 wherein step (B) is performed by the substep of defining the condition when brake drag exists as the condition when at least one of the actual wheel speeds is decreasing relative to the vehicle speed.

11. The method of claim 1 wherein step (C) is performed by the substeps of using said electronic controller for cyclically opening and closing the outlet valve at a preselected frequency for a preselected period of time.

12. A method of eliminating excessive brake fluid pressure buildup that causes undesirable brake drag in a vehicle open hydraulic antilocking brake system of the type having an electronic controller and a brake conduit connected to a normally closed outlet valve that is connected to a pressure relief conduit, comprising the steps of:

(A) determining a time when the antilocking brake system is deactivated subsequent to having been activated, using the electronic controller;

(B) determining a condition when brake drag exists, using a first set of data available from the electronic controller, said first set of data defining the vehicle speed and the speed of each wheel, respectively; and (C) pulsing the normally closed outlet valve at a preselected frequency for a preselected period, beginning at the time in step (A) when the condition from step (B) exists, using the electronic controller, to thereby allow the excessive brake fluid pressure to exit the brake conduit through the normally closed outlet valve and the pressure relief conduit.

13. The method of claim 12 wherein step (A) is performed by the substeps of determining a switch off time when a brake light switch is switched to an off position, using the electronic controller to determine the brake light switch state and defining the time when the antilocking braking system is deactivated as the switch off time.

14. The method of claim 12 wherein step (A) is performed by the substeps of determining a switch off time when a brake active indicators indicates that the brake system has been deactivated and defining the time when the antilocking brake system is deactivated, the brake active indicator being part of the electronic controller.

15. The method of claim 12 wherein step (A) is performed by the substeps of determining a pedal release time when the brake pedal has been applied and subsequently released, using a brake pedal sensor, the brake pedal sensor being part of the electronic controller and defining the time when the antilocking braking system is deactivated as the pedal release time.

16. The method of claim 12 wherein step (B) is performed by the substeps of determining the wheel speed of each wheel, respectively, using the electronic controller, determining the vehicle speed, using the determined wheel speeds and the electronic controller, and comparing the vehicle speed to the wheel speeds, respectively.

17. The method of claim 16 wherein step (B) is performed by the substep of defining the condition when brake drag exists as the condition when the wheel speeds are decreasing relative to the vehicle speed.

18. A system for eliminating excessive brake fluid pressure buildup that exceeds a preselected fluid pressure and causes undesirable brake drag in a vehicle hydraulic brake system of the type having a master cylinder connected to wheel brakes through a brake conduit, comprising:

a valve connected to the brake conduit, said valve remaining closed during normal braking operations;

a pressure relief conduit connected at one end to said valve and connected at an opposite end to the master cylinder;

indicator means for indicating when the brake system has been activated and subsequently deactivated; and pulsing means for cyclically opening and closing said valve at a preselected frequency for a preselected period to thereby allow the excessive brake fluid pressure to exit the brake conduit and return to the master cylinder through said pressure relief conduit to thereby reestablish the pressure within the brake system at the preselected pressure.

19. The system of claim 18 wherein said valve comprises an electromechanically actuated normally closed valve.

20. The system of claim 18 wherein said indicator means comprises a brake light switch that effectively turns a brake light on the vehicle on and off, respectively.

21. The system of claim 20 wherein said indicator means further comprises a relay switch that responsively switches to an on position when said brake light switch turns on and subsequently off thereby indicating that the brake system has been activated and subsequently deactivated.

22. The system of claim 21 wherein said pulsing means is coupled to said relay switch such that said pulsing means to activated responsively to said relay switch switching to an on position thereby eliminating the undesirable brake fluid from the brake conduit by pulsing said valve at said preselected frequency for said preselected period.

23. The system of claim 22 further comprising timing means for regulating said preselected frequency and period.

24. The system of claim 18 wherein said pulsing means comprises an electromechanical trigger adapted to respectively open and close said valve.

* * * * *